United States Patent [19]

Van Der Hoorn et al.

[11] Patent Number: 5,037,352
[45] Date of Patent: Aug. 6, 1991

[54] DEVICE FOR THE PLACING OF SPREADERS

[75] Inventors: Rudolf J.G.A. Van Der Hoorn, Nuenen; Henrikus P. M. Clerx, Baarlo, both of Netherlands

[73] Assignee: CCM Beheer B.V., Netherlands

[21] Appl. No.: 510,611

[22] Filed: Apr. 18, 1990

[30] Foreign Application Priority Data

Apr. 19, 1989 [NL] Netherlands ............... 8900979

[51] Int. Cl.$^5$ ............................................. A22C 15/00
[52] U.S. Cl. ................................... 452/197; 452/182
[58] Field of Search .............. 17/23, 44, 44.2, 44.3, 17/44.4, 24; 452/197, 179, 182

[56] References Cited

U.S. PATENT DOCUMENTS

| 795,700 | 3/1904 | Heidenreich et al. | 17/44 |
| 3,077,997 | 2/1963 | Toennies | 214/59 |
| 3,766,604 | 10/1973 | Lunn et al. | 17/44.2 |
| 3,988,803 | 11/1976 | Hamark | 17/23 |
| 3,991,441 | 11/1976 | Giger, Jr. | 17/44 |
| 3,991,441 | 11/1976 | Giger, Jr. | 17/24 |
| 4,873,749 | 10/1989 | Couture | 17/50 |

FOREIGN PATENT DOCUMENTS

| 571286 | 6/1985 | Australia . |
| 142451 | 7/1981 | European Pat. Off. . |
| 527442 | 6/1931 | Fed. Rep. of Germany . |
| 1531124 | 11/1978 | United Kingdom . |

Primary Examiner—Frederick R. Schmidt
Assistant Examiner—Mark A. Morris
Attorney, Agent, or Firm—Hurt, Richardson, Garner, Rodd & Cadenhead

[57] ABSTRACT

A device for the placing of a spreader in the hind legs of a slaughtered animal comprising two penetration devices, each of which comprises a penetration pin provided with a pointed end, a penetration tube which is movable in the axial direction and is open at one end, the penetration pin being axially accommodated within the penetration tube and the penetration pin being movable within the penetration tube in the axial direction, and a slide-off mechanism which is movable relative to the penetration tube. In operation, the laps of the slaughtered animal are positioned relative to the penetration device and the toes of the slaughtered animal are bent relative to its legs virtually at a right angle with the aid of a toe presser. The penetration tube with the penetration pin projecting therefrom is inserted through a hind leg of the slaughtered animal between the bone and the tendons thereof, the penetration pin is retracted into the penetration tube, the hind legs are spread, the opening of each penetration tube is placed over a corresponding end of the spreader, each hind leg is moved off the penetration tube onto the corresponding end of the spreader by means of the slide-off mechanism, and the penetration tubes are freed from the ends of the spreader.

13 Claims, 14 Drawing Sheets

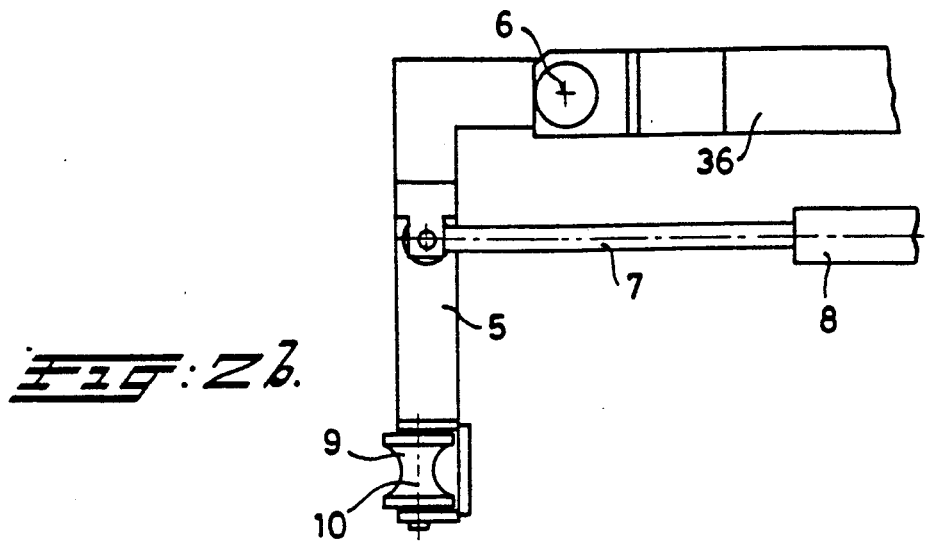
FIG: 2b.
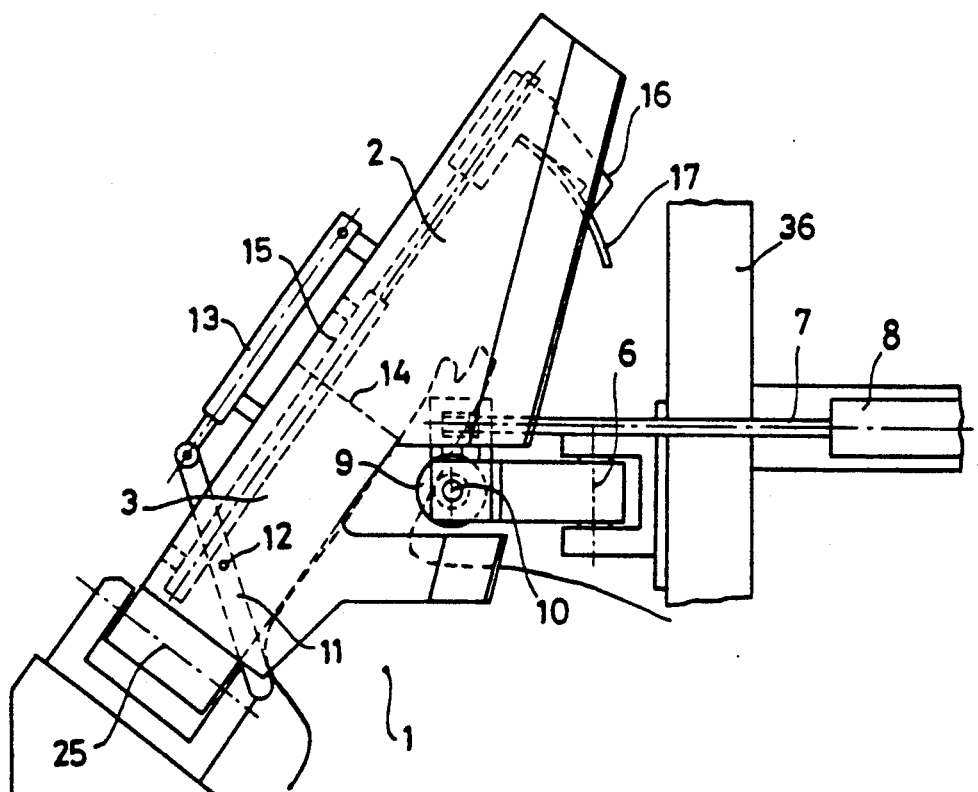
FIG: 2a.

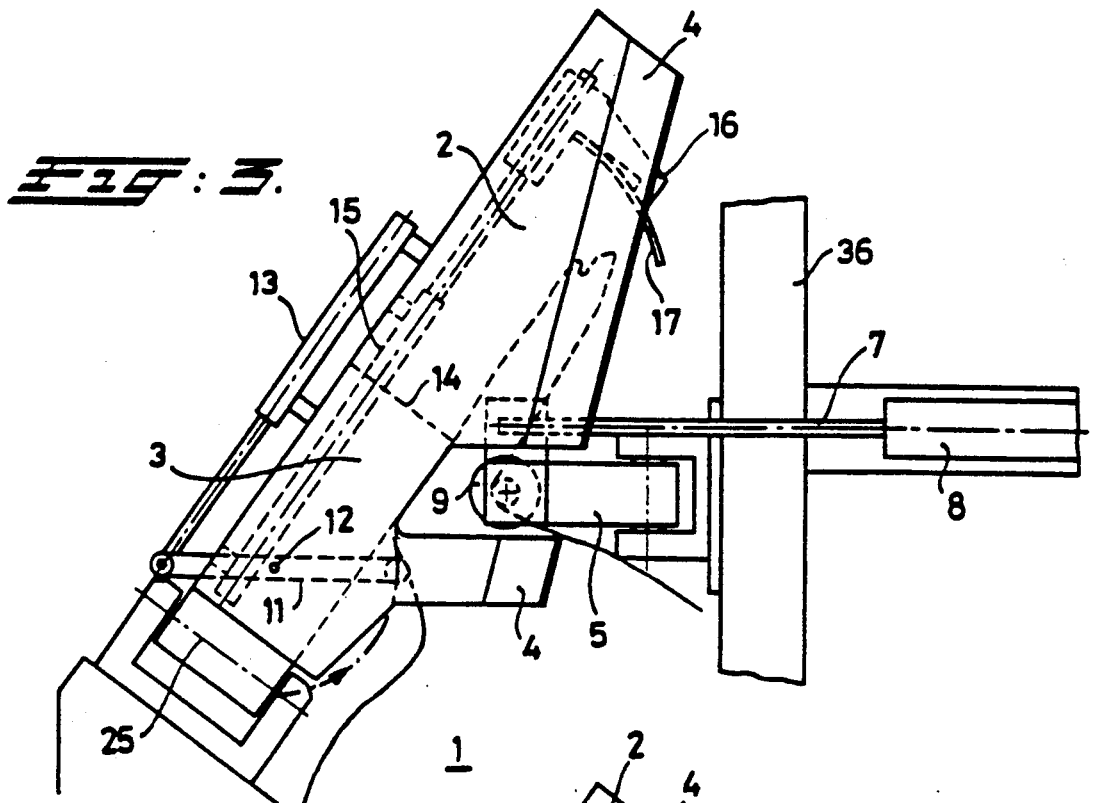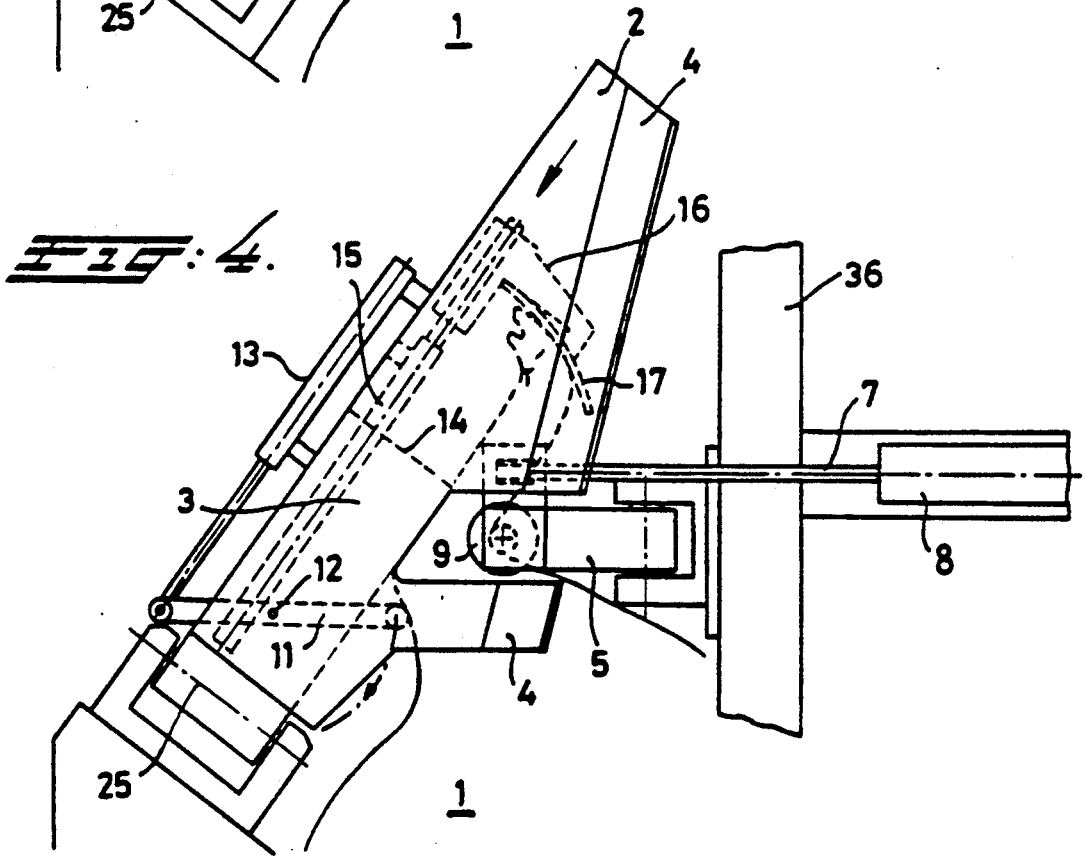

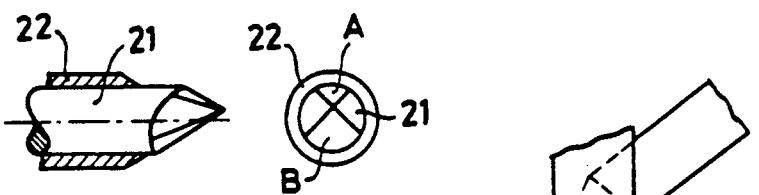
Fig:10a.    Fig:10b.
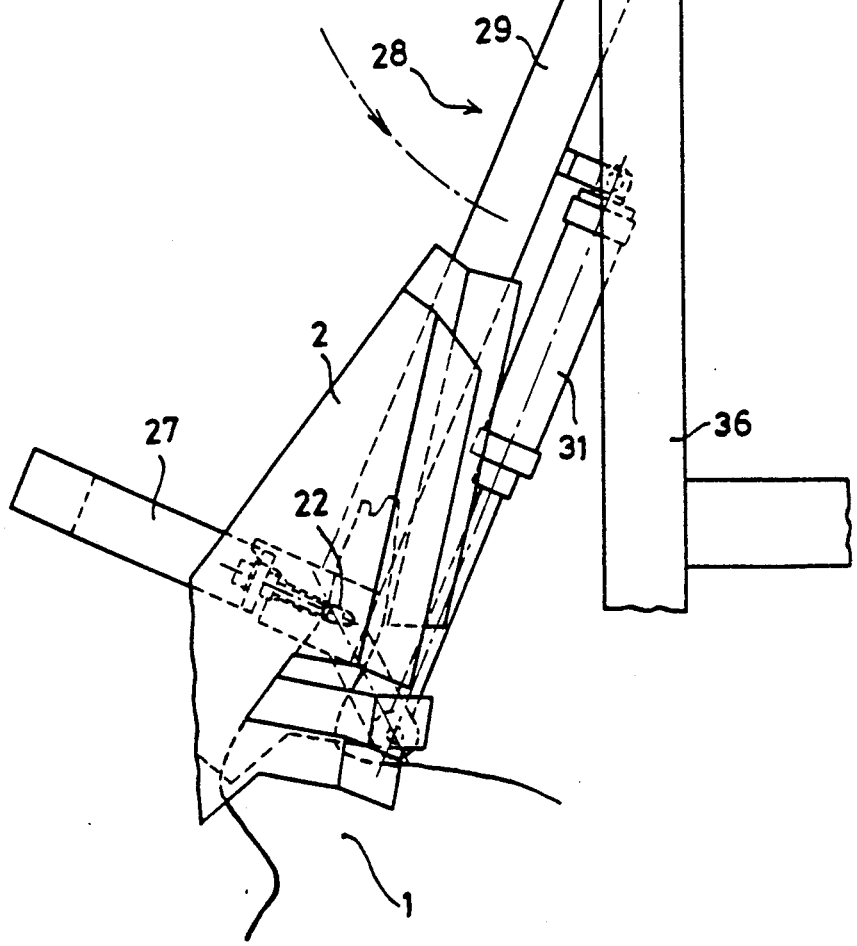
Fig:11.

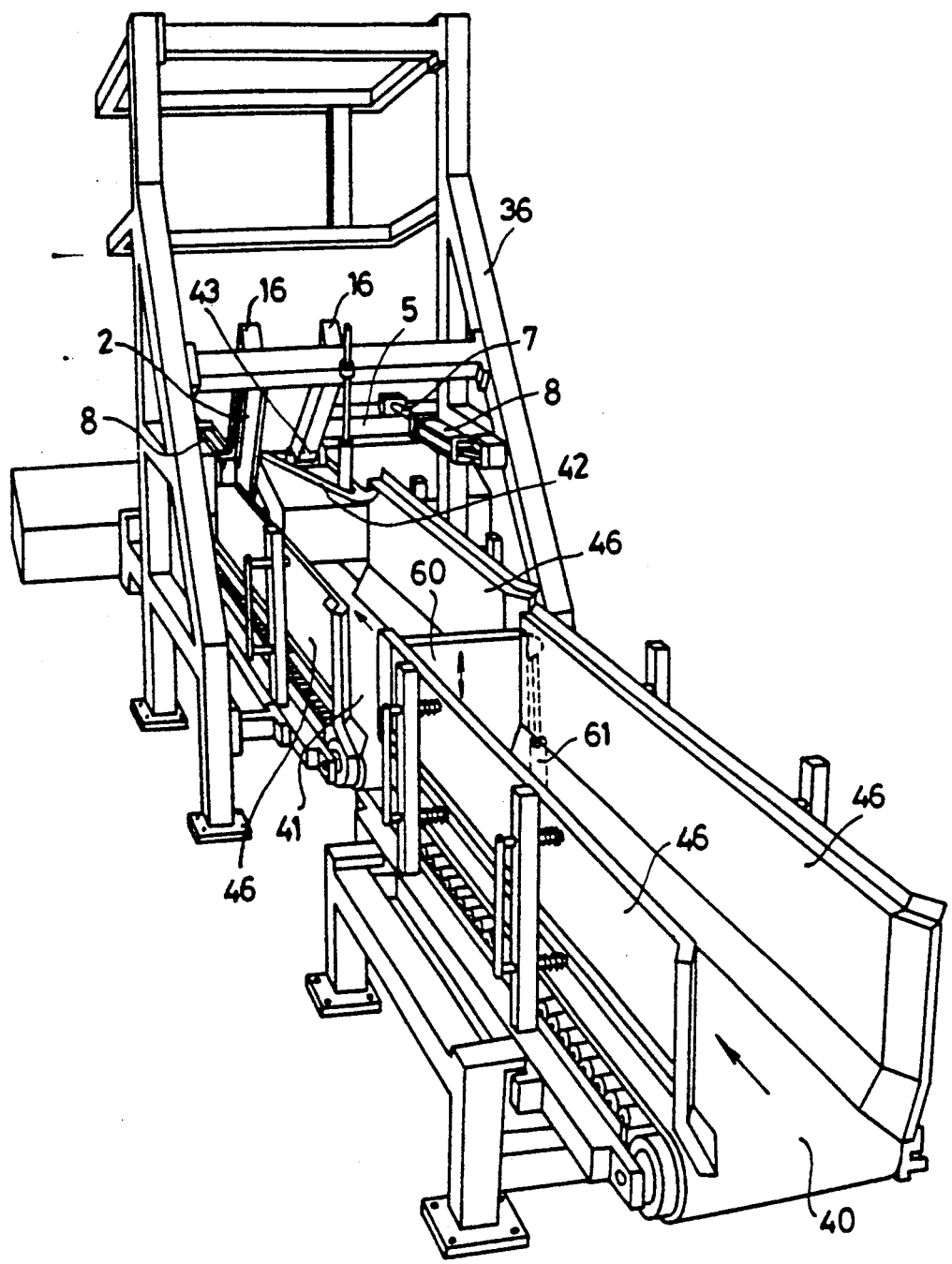
Fig:18.

DEVICE FOR THE PLACING OF SPREADERS

BACKGROUND OF THE INVENTION

This invention relates to a device for the placing of spreaders in the hind legs of slaughtered animals, in particular pigs.

DISCUSSION OF THE PRIOR ART

Suspending slaughtered animals by the hind legs from a so-called spreader (suspension brace) for processing of the carcass is generally known. This spreader has two ends which in the position in which the spreader is used point upwards and are each inserted through a hind leg between the bone and the adjacent tendons. The spreader is further provided with a conveyance hook, by means of which conveyance of the slaughtered animal on the spreader through the slaughterhouse is simple to achieve with a conveyor. Another function of the spreader is to keep the hind legs spread, so that the belly side of the animal is readily accessible to the butcher.

It has hitherto been customary to place the spreader manually in the hind legs of the slaughtered animal. For this, an incision has to be made with a sharp object, for example a knife, at the desired point in a first hind leg, into which incision one end of the spreader can be inserted. After this, it is not easy to place the spreader, since the forced incision has the tendency to close on removal of the knife. It is important here to relax as much as possible the tendons running along the bone, in order to obtain the required space for the placing of the spreader. In order to relax the tendons, the toes of the hind leg must be bent back as far as possible, and the legs must be in a natural position as far as possible, with little or no spread.

Bending the toes requires a relatively great exertion of force.

For the placing of the second end of the spreader in the second hind leg, an additional complication is that the spreader, one end of which is already placed, is difficult to manipulate, while the toes of the second hind leg have to be bent and the legs have to be spread simultaneously. During the spreading of the hind legs, they twist outwards about the lengthwise direction, so that the incision to be made in the second hind leg does not lie parallel to the incision in the first hind leg.

Account must also be taken of differences in build of the body between different animals.

It will be clear that for its placing the spreader is detached from the spreader conveyor, because it is easier to handle than the much heavier animal. After placing of the spreader in the hind legs of the animal, it is returned to the conveyor, with the animal suspended from it.

Recapitulating, the placing of a spreader manually requires considerable human effort and is relatively time-consuming.

SUMMARY OF THE INVENTION

The object of the invention is to provide a device by which the placing of a spreader can be carried out mechanically.

This object is attained by the deice according to the present invention which comprises two penetration devices, each of which comprises a penetration pin having a pointed end and a penetration tube which is movable in the axial direction and is open at one end, and a slide-off mechanism which is movable relative to the penetration tube. The penetration pin is accommodated axially within the penetration tube and is movable within the penetration tube in its axial direction. The device of the present invention further comprises means for positioning of the legs of the slaughtered animal relative to the penetration device and toe presser means for bending the toes of the slaughtered animal relative to its legs virtually at a right angle. Further, the device of the present invention comprises means for positioning and fixing the slaughtered animal such that the device may act upon the slaughtered animal, and control means for moving and placing the slaughtered animal, the spreader, the leg positioning means, the toe pressers, and the penetration devices in such a way that the device can properly act upon the slaughtered animal.

In operation, the penetration pin projects from the open end of the penetration tube such that the penetration tube together with the penetration pin projecting therefrom may be inserted at a predetermined place on the slaughtered animal, generally through a hind leg between the bone and the tendons thereof. The penetration pin is inserted at this predetermined place forming an opening which allows the penetration tube also to be inserted through the hind leg. Following insertion, the penetration pin is retracted into the penetration tube, the hind legs with the penetration tubes placed in them are spread, the opening of each penetration tube is placed over a corresponding end of the spreader, each hind leg is moved off of the respective penetration tube and into the corresponding end of the spreader by means of the slide-off mechanism, and the penetration tubes are free from the ends of the spreader.

In the device according to the invention the legs are positioned and fixed by mechanical means in a predetermined manner, while the jobs which were previously carried out by hand, such as bending the toes, making incisions and placing spreaders, can now be carried out particularly quickly and reproducibly without human intervention.

Other claims and many of the attendant advantages will be more readily appreciated as the same becomes better understood by reference to the following detailed description and considered in connection with the accompanying drawings in which like reference symbols designate like parts in the figures.

DESCRIPTION OF THE DRAWINGS

FIG. 1b shows a top view the fixing means according to FIG. 1a;

FIGS. 2a, 2b and 3–5 shows the leg positioning device and the fixing means according to FIG. 1a and FIG. 1b, illustrating successive stages in positioning and fixing of a hind leg;

FIGS. 10a and 10b show in side view and front view, respectively, a preferred embodiment of the penetration pin point;

FIG. 11-12 show a side view of an embodiment of a spreader positioning device according to the invention, to illustrate the positioning of the spreader between the spread hind legs;

FIG. 18 shows a partial perspective view of the spreader-placing device described;

DESCRIPTION OF THE PREFERRED EMBODIMENT

Figure 1B:
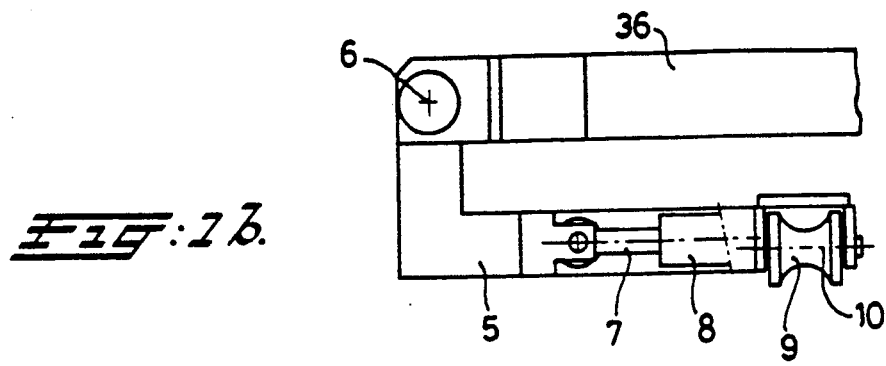

Where arrows without reference numerals are shown in the figures, direction of movement of parts are indicated.

Figure 1A:
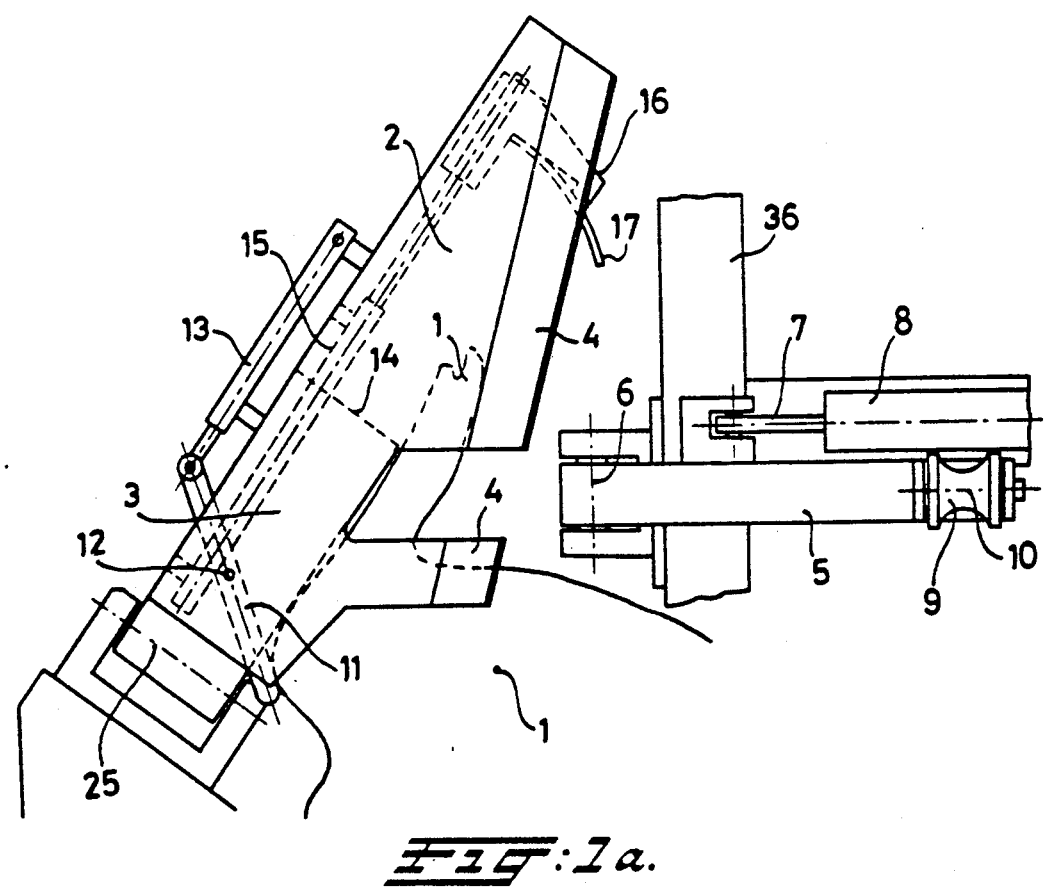
FIG. 1a side view of an embodiment of a leg positioning device, and fixing means according to the invention.

FIG. 1a shows a hind leg 1 of a pig lying on its back, positioned in an element which is U-shaped in cross-section, and described below as a leg holder 2. The leg holder 2 has a leg stop 3, against which the rear side of the hind leg 1 rests, and two parts which support the hind leg 1 on either side. These parts, only one of which can be seen in the figure, are made mirror-symmetrical and are provided with flaring lead-in parts 4 which facilitate the insertion of the legs 1 into the leg holder from the righthand side. The above-mentioned parts are provided with a recess at this side of the leg holder 2.

A leg-fixing means, described below as a leg presser 5, is fitted near the leg holder 2 and cooperates therewith. Said leg presser 5 is fixed to a frame 36 in such a way that it is rotatable about an axis 6, and the leg presser 5 can be turned by extending a drive rod 7, rotatably connected to the leg presser 5, out of a doubleacting cylinder/piston unit 8. The leg presser also has an hourglass-shaped wheel 9 which is fixed so that it can rotate about an axis 10. The design of the leg presser 5 is illustrated further with reference to FIG. 1b, which shows a top view of the leg presser 5.

FIGS. 2a and 2b again show the leg holder 2 and the leg presser 5, in this case the leg presser 5, after being turned, fixing the hind leg 1 with the wheel 9 against leg stop 3.

The cylinder/piston unit 8 and the units 13, 15, 23, 24, 26, 31 and 61 hereafter to be discussed are energized by means of a central control.

FIGS. 3-5 show again the positioning and fixing means according to FIG. 1a. Reference number 11 indicates an element, called a heel pusher below, comprising a lever which is rotatable about an axis 12 by means of a drive rod of a double-acting cylinder/piston unit 13. With the heel pusher 11, the hind leg 1 can be pushed upwards along the leg stop 3, partly due to the fact that the leg presser 5 is provided with the wheel 9 which can turn during the sliding upwards. With the heel pusher it is possible, despite differences in leg size and initial fixing of the leg 1 against the leg stop 3, to move the place where the toes have to be bent to a position above the top face 14 of the leg stop 3. This is illustrated in FIG. 3. An element, described below as a toe presser 16, is then moved downwards, again by means of a drive rod of a double-acting cylinder/piston unit 15. The toe presser is provided with a curved surface 17 which is tilted slightly towards the front side of the toes, by means of which the toes are bent after contact between the toes and said surface 17. Prior to or during the downward movement of the toe presser 16, the heel pusher 11 is returned to its initial position, so that the leg 1 with the toes bent through approximately 90° relative to the leg can slide down between the leg stop 3 and the wheel 9 until the toes are resting on the top face 14 of the leg stop 3. The movement of the toe presser 14 is illustrated in FIG. 4. On completion of this movement, the hind leg 1 is fully positioned and fixed, this situation being illustrated in FIG. 5. At the same time, the manipulations described with reference to FIGS. 1-5 have also taken place with the other hind leg, both hind legs being spread little if at all, something which is determined by the positioning of one leg holder 2 relative to the other.

Figure 6:
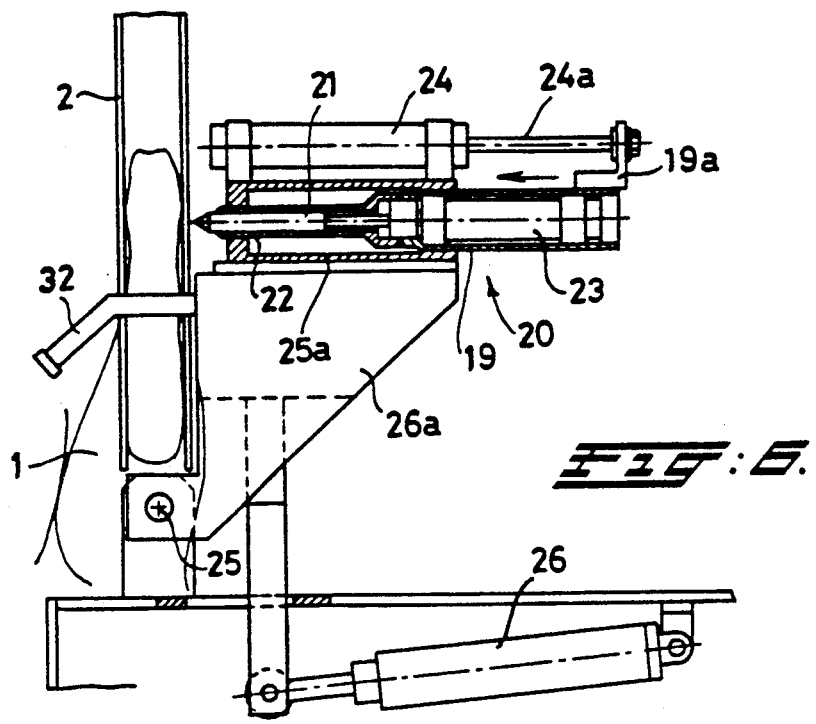
FIG. 6 a side view, also a partial cross-section, of an embodiment of a penetration device according to the invention fitted at one side of the leg positioning device.
Figures 7, 8:
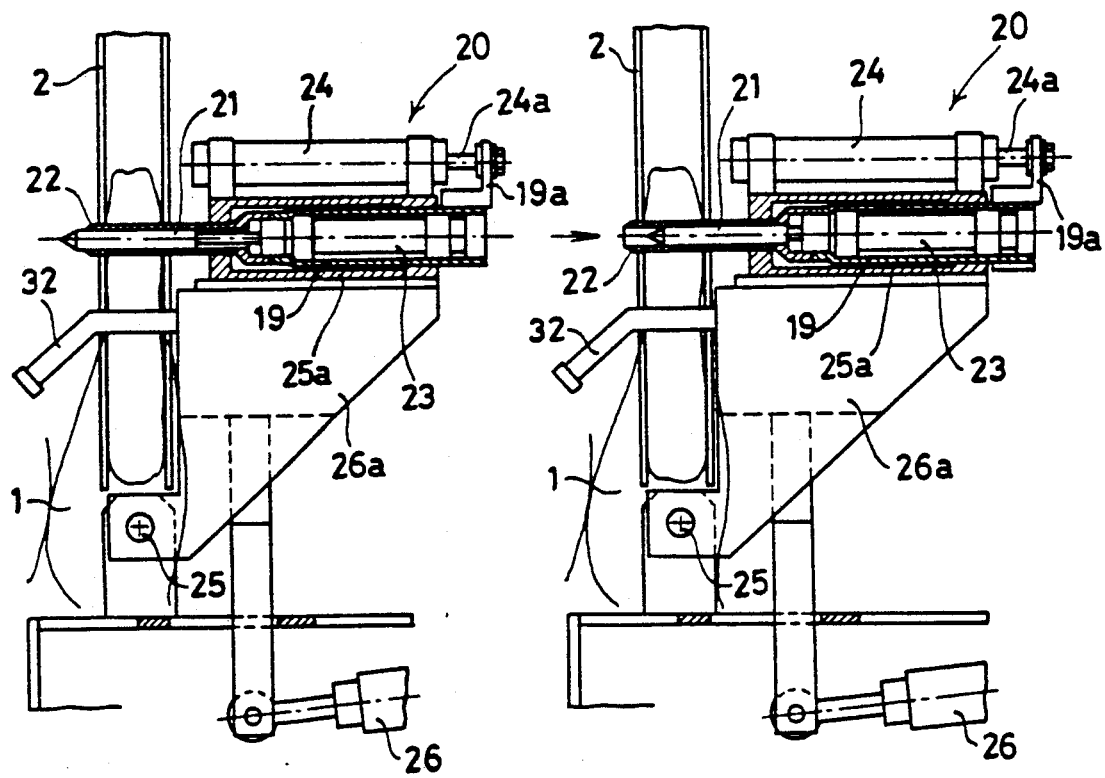
FIGS. 7–8 the penetration device according to FIG. 6, illustrating successive stages of penetration into the hind leg.

FIGS. 6-8 show the rear side of the hind leg 1, adjacent to which a penetration device 20 according to the invention is set up. For the sake of clarity, the leg stop 3, the heel pusher 11 and the toe presser 16 with the operating equipment are not shown here. The penetration device 20 comprises, inter alia, a penetration pin 21, a penetration tube 22, and two double-acting cylinder/piston units 23, 24 for moving the penetration pin 21 and the penetration tube 22.

Figure 5:
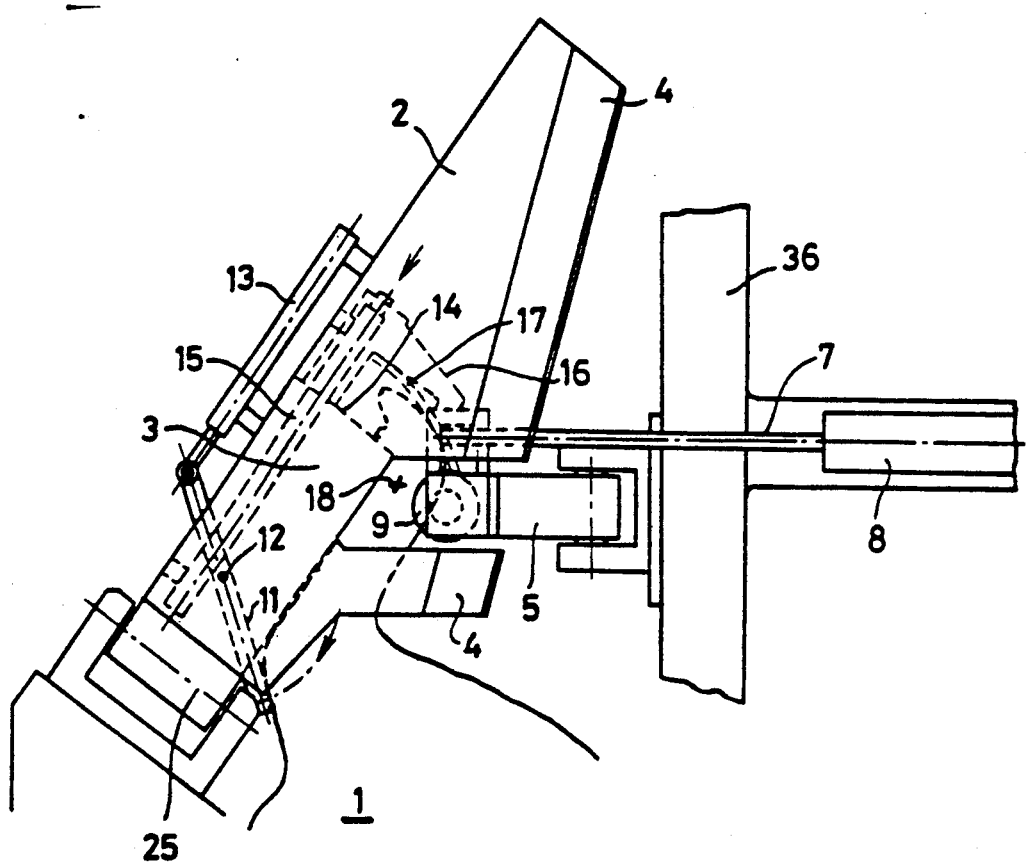

FIG. 6 shows the initial position of the penetration device 20, ready for thrusting towards the point 18 shown, for example, in FIG. 5. The penetration pin 21 is provided with a point, a preferred embodiment of which will be discussed below with reference to FIGS. 10a and 10b, and is disposed so that it is axially displaceable by means of the cylinder/piston unit 23 in the penetration tube 22. The penetration pin 21 can take up two positions here: a position in which the point of the penetration pin 21 projects from the penetration tube 22, and a position in which the point of the penetration pin 21 is retracted into the penetration tube 22. The cylinder/piston unit 23 which drives the penetration pin 21 is fixed inside a sleeve 19 which is connected to the penetration tube 22, which sleeve is fixed on the piston rod 24a of the cylinder/piston unit 24 by means of the corner piece 19a.

The penetration tube 22 is thus axially displaceable by means of the cylinder/piston unit 24, during which movement the penetration pin 21 is carried along, if the cylinder 23 is energized in the direction of the arrow. Penetration tube 22 and sleeve 19 are slidably guided in a suitable guide piece 25a, fixed to the bracket 26a, which is rotatable about the axis 25.

From the initial position, shown in FIG. 6, the penetration pin 21 and the penetration tube 22 are inserted at penetration place 18 by the unit 24 through the hind leg 1, which is fixed by means of the leg presser 5 and the toe presser 16 on the leg stop 3. This place is determined in such a way that the point of the penetration pin is inserted between the bone and the tendons running along the bone.

FIG. 7 shows the result of this action, which is followed by retracting the penetration pin 21 into the penetration tube 22 by means of a unit 23, which is shown in FIG. 8.

After the penetration tube 22 is placed in the hind leg 1 in the manner described above, the positioning and fixing means, which until then were pressing the leg 1 against the leg stop 3, i.e. the leg presser 5 and the toe presser 16, are moved back to their initial position.

Figure 9:
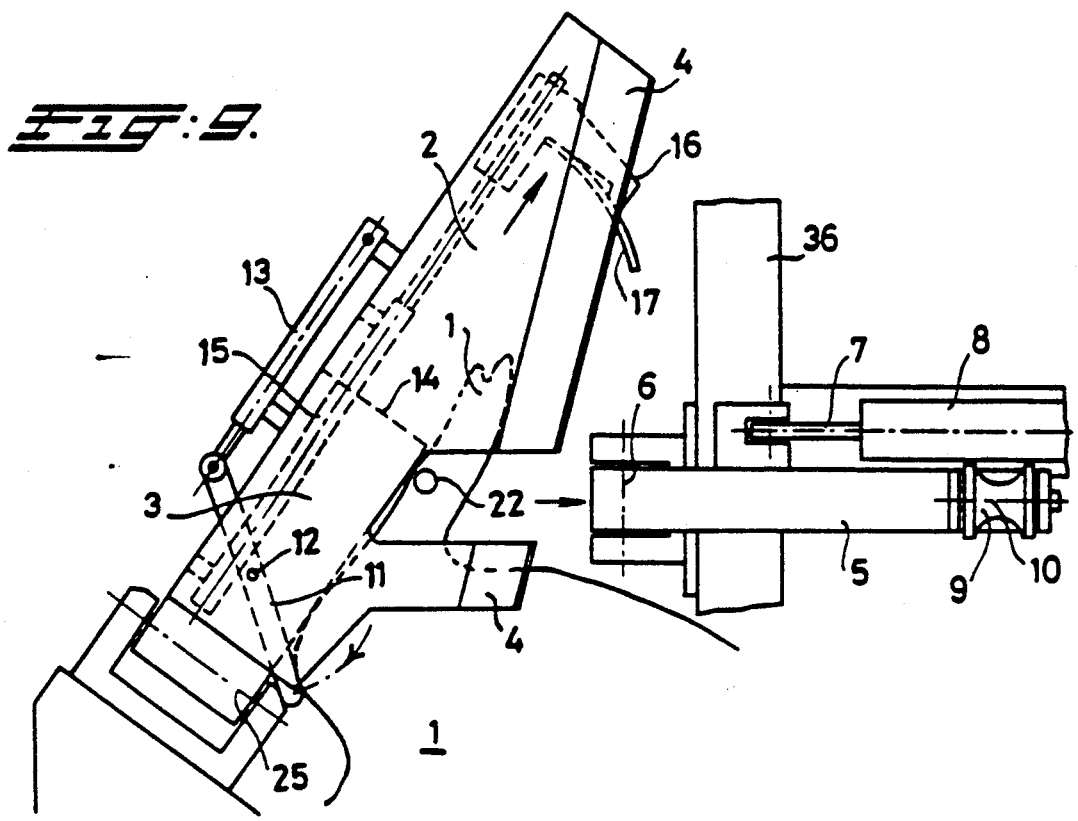
FIG. 9 shows a side view of the leg positioning device FIG. 1a, in which the situation after penetration is shown.

FIG. 9 shows the released hind leg 1, with the penetration tube 22 shown schematically therein, in a view according to FIG. 1a. The leg is positioned laterally here by the leg holder 2.

The device according to the invention comprises two penetration devices 20 of the type described above, one for each hind leg, which devices are designed mirror symmetrically relative to an imaginary vertical plane, halfway between the hind legs 1 of the animal.

Figure 10:
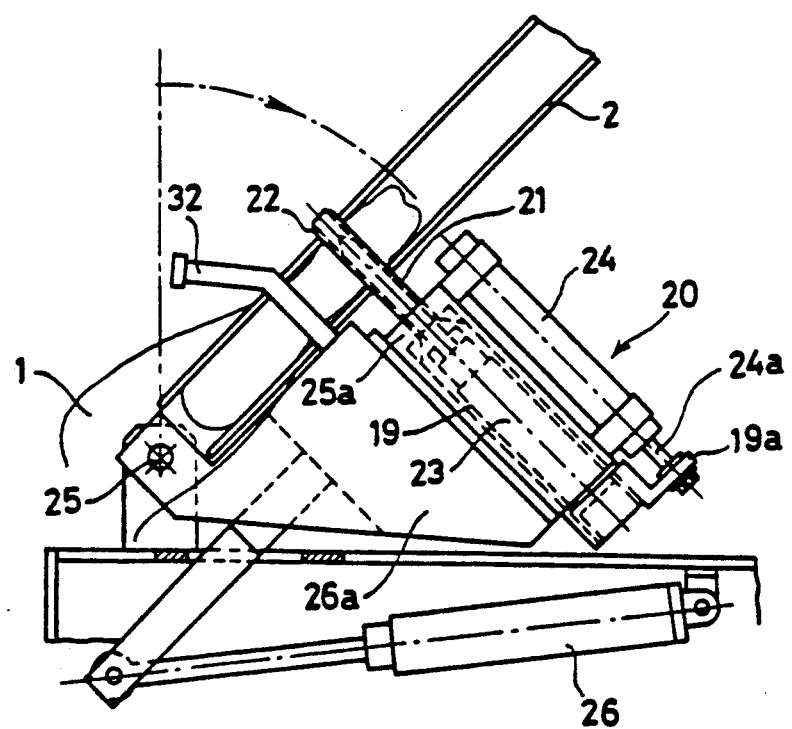
FIG. 10 shows the lateral swinging away of the penetration device according to FIG. 8, together with the hind leg and the penetration tube placed in it.

FIG. 10 then shows the stage of the lateral swinging away of a penetration device 20 together with the leg holder 2, about the axis 25, by means of the double-acting cylinder/piston unit 26. This takes place for the two penetration devices 20 simultaneously, but in opposite directions, so that the hind legs are thus spread.

The penetration pin 21 is preferably provided with a point which does not lie on the axis of the penetration pin 21, but is off-center relative thereto in a position which during the penetration lies closer to the bone than to the tendons, in order always to make a correct penetration in the case of legs 1 of different animals with slightly differing proportions.

FIGS. 10a and 10b show in side view and front view respectively a preferred embodiment of the penetration pin point. The point is formed by the cutting point of four faces, and the pin is arranged in such a way in the penetration device 20 that the face A moves along the bone during the penetration, and the face B moves along the tendons during the penetration. The joint penetration of the penetration pin 21 and the penetration tube 22 can also be facilitated by providing the end of the penetration tube 22 with a bevelled edge, as shown in FIG. 10a.

FIG. 11 next shows the placing of a spreader 27 between the spread hind legs 1 in the leg holders 2. The spreader 27 is brought into the desired position in two stages by means of a spreader positioning device 28 in which the spreader is fixed. In the first instance, the arm 29 is turned downwards about the axis of rotation 30, by means of a drive (not shown in any further detail), from an essentially horizontal position until the ends of the spreader 27 are at the same level as the penetration tube 22, as shown in FIG. 11.

Figure 12:
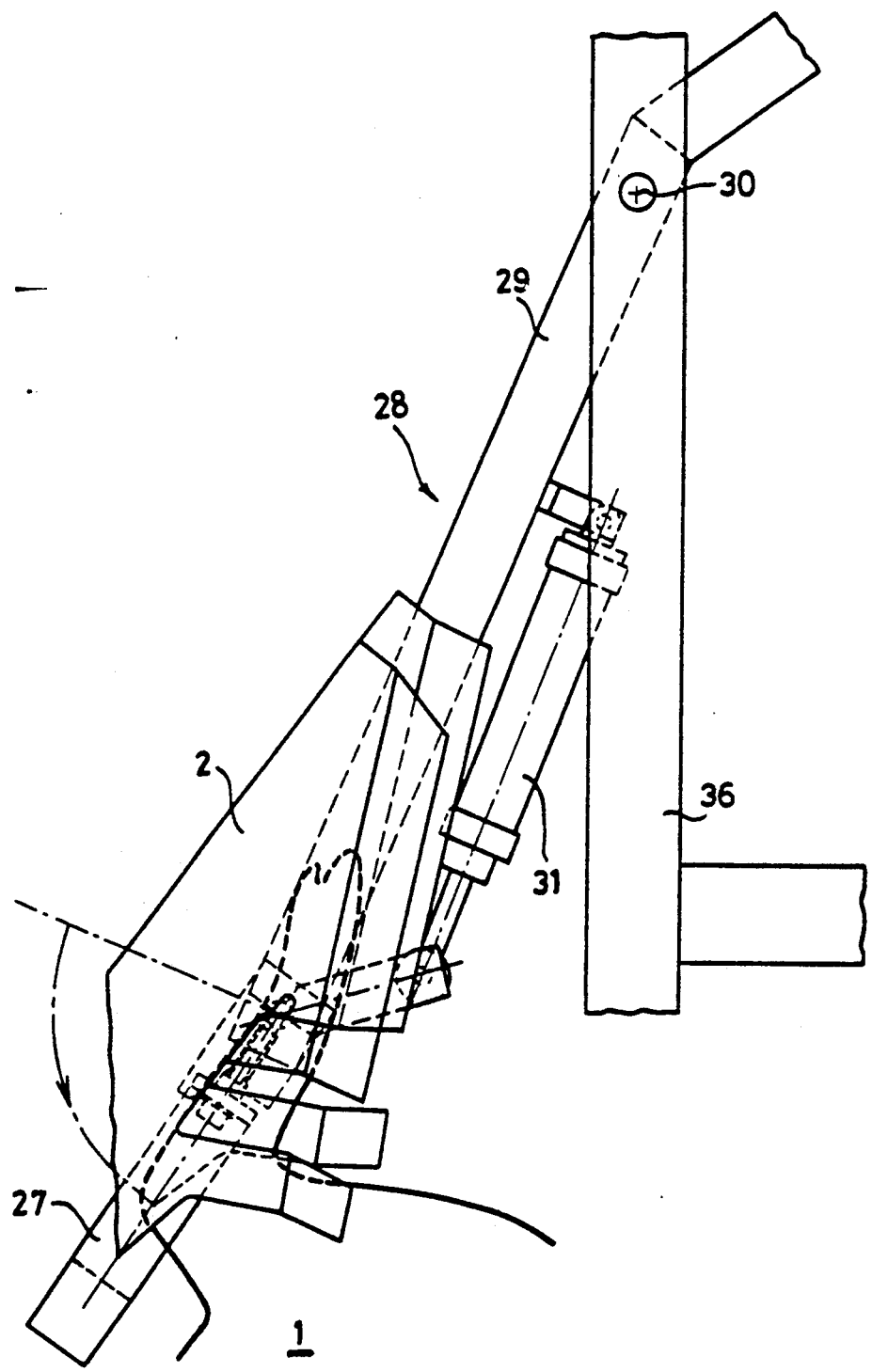

FIG. 12 shows the spreader manipulation in the second instance, produced by the double-acting cylinder/piston unit 31 fixed on the arm 29 of the spreader positioning device. This movement consists of a tilting movement about an axis of rotation at the level of the penetration tube 22. The spreader 27 is in this way taken into a virtually vertical position, in which the two ends of the spreader 27 are on a horizontal line, and the conveyance hook thereof is hanging down.

Figure 13:
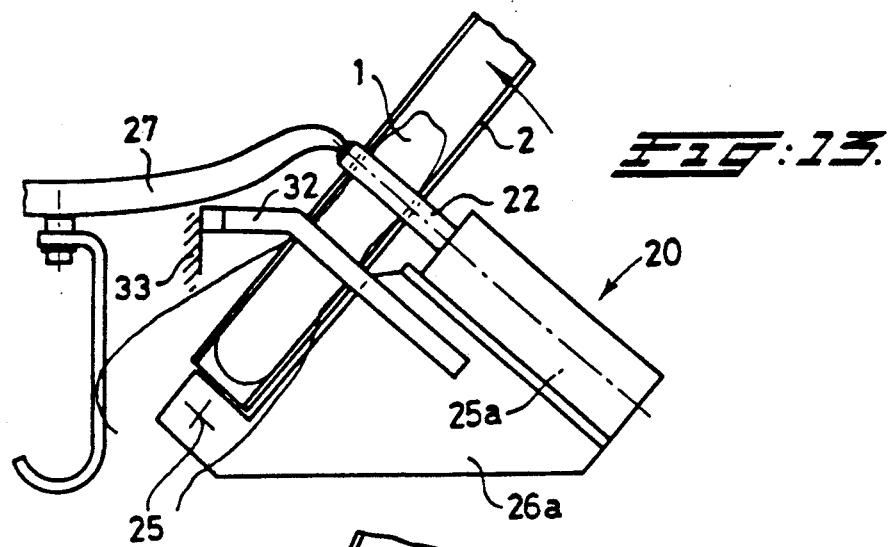
FIGS. 13-15 show a part of the penetration device according to FIG. 10 relating to the positioning of a penetration tube relative to one end of the spreader, to illustrate the transfer of the hind leg from the penetration tube to the end of the spreader.
Figure 14:
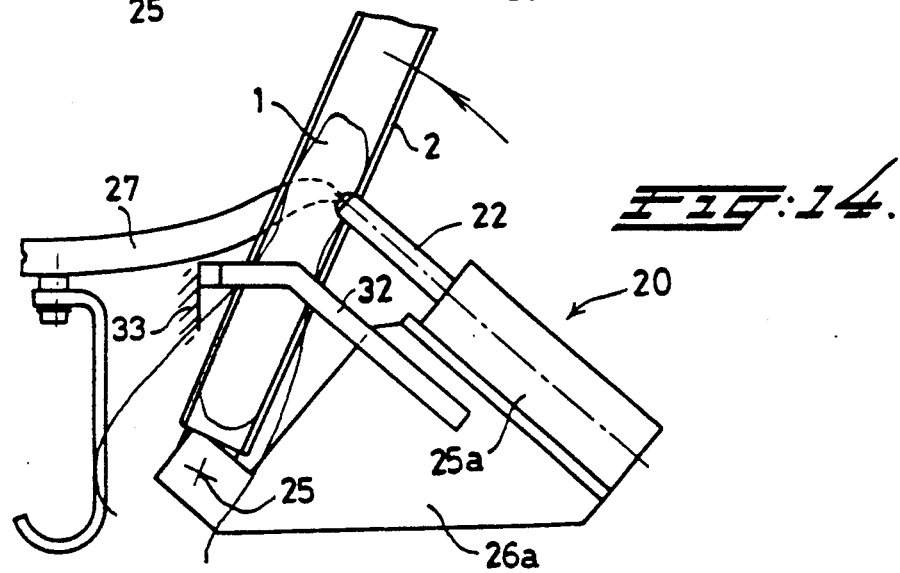
Figure 15:
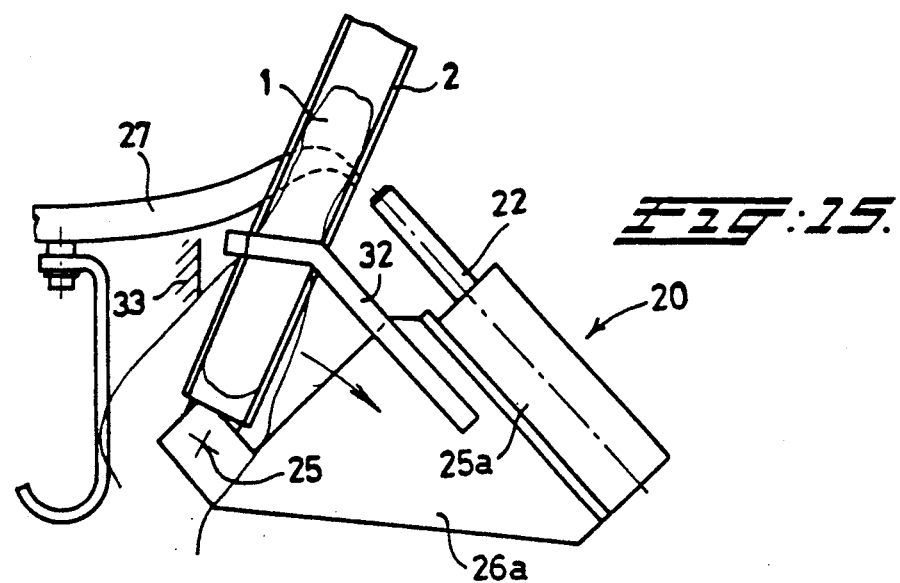

FIGS. 13-15 then show the way in which a hind leg is transferred from the penetration tube 22 to the positioned spreader 27. In these figures, non-essential parts such as the spreader positioning device 28, are omitted for the sake of clarity, and the parts which are shown are indicated schematically.

FIG. 13 shows the way in which the penetration device 20 with the penetration tube 22 and the leg holder 2—and thus the leg—are turned about the center of rotation 25 in such a way that the open end of the penetration tube is placed over one end of the spreader.

The movement of the penetration device 20 is stopped here by the arm 32 connected thereto which meets the stop 33. The stop 33 prevents the penetration tube 22 from being pressed hard onto the end of the spreader, so that there is no risk of jamming and damage.

FIG. 14 shows the sliding of the hind leg off the penetration tube. In the embodiment shown, use is made of the leg holder 2 as the slide-off mechanism, but it is of course possible to use another mechanism for this, if the leg holders are swung aside.

FIG. 15 shows the turning back of the penetration device 20 with the penetration tube 22, after the hind leg is placed fully on the spreader.

The advantage of such turning of the spreader that the ends thereof point downwards is clear from the above figures and descriptions of figures. These ends then lie virtually in line with the axis of each penetration tube, and the sliding of the legs off the penetration tubes onto the spreader ends then takes place particularly easily.

Figure 16:
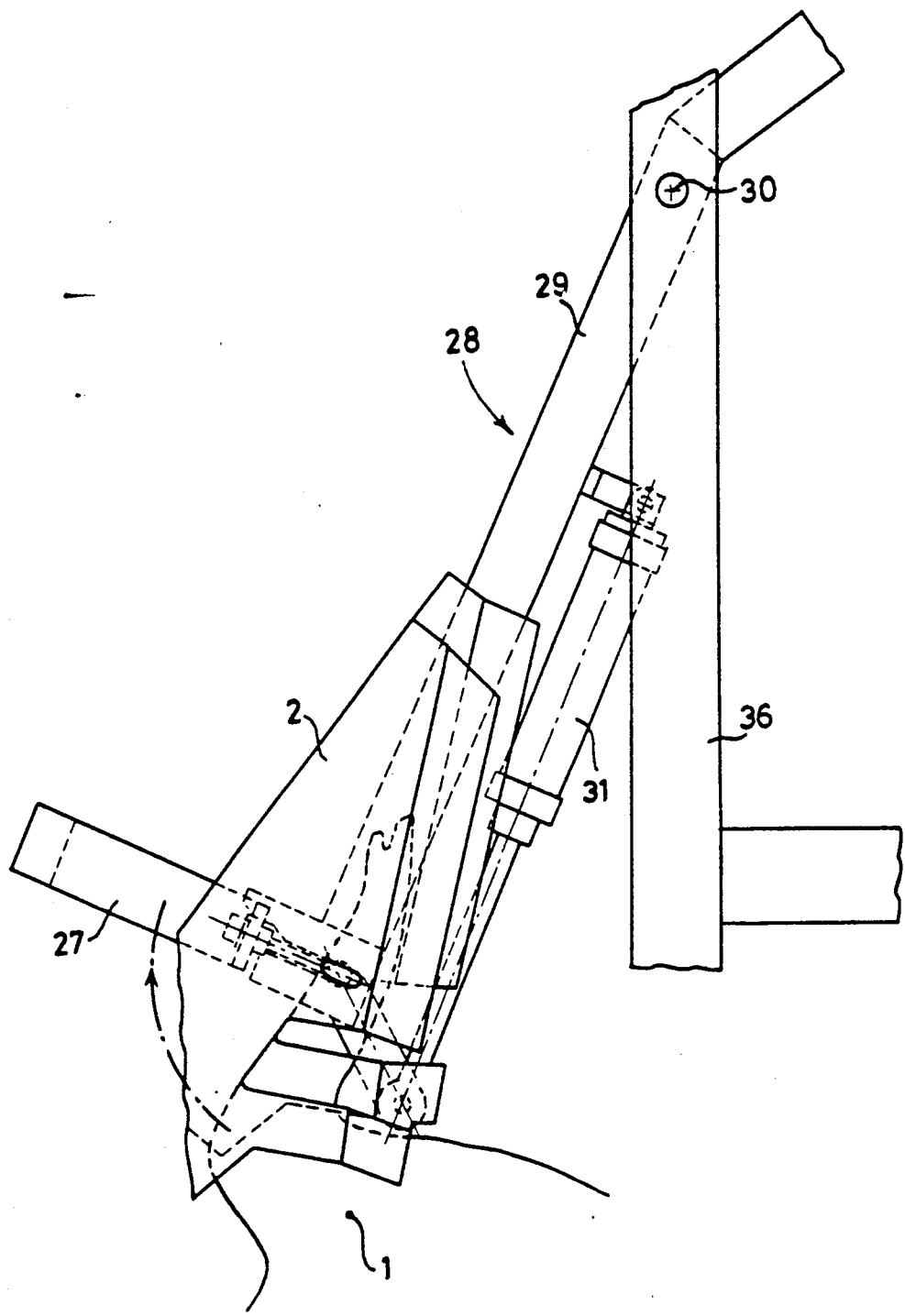
FIGS. 16-17 show the spreader positioning device, to illustrate the placing of the spreader, loaded with the animal, on a conveyor.

In FIG. 16 the spreader placed in the hind leg is moved back by the unit 31 of the spreader positioning device 28 to the position shown in FIG. 11.

Figure 17:
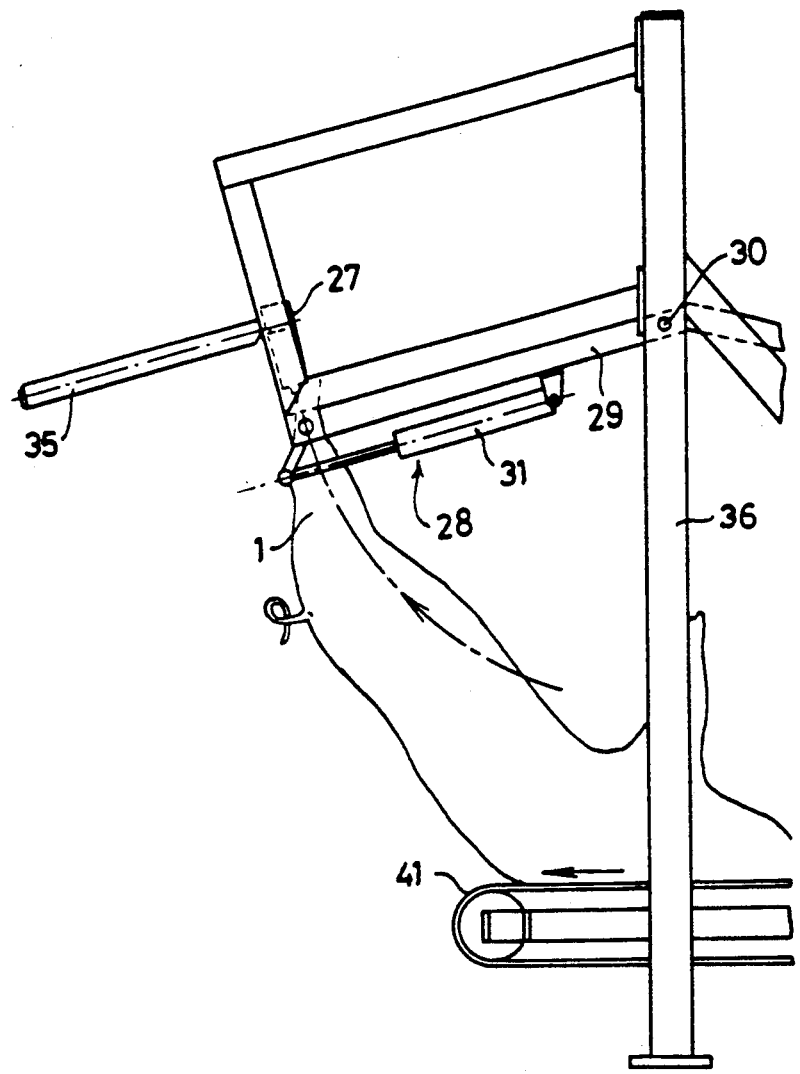

FIG. 17 shows the movement of the arm 29 back to the initial position by means of a drive, which is not shown in any further detail. Prior to this movement, the leg holder 2 is swung away, in order to provide the necessary space. Since the spreader 27 is placed in the two hind legs 1 of the slaughtered animal, the animal is also carried up during the upward movement of the arm 29. The arm movement is facilitated by moving the animal simultaneously by means of a conveyor belt 41 in the direction shown. The conveyance hook of the spreader is placed in the position shown, by means which are not shown in any further detail, on a conveyance tube 35 which is arranged at an angle to the horizontal plane, as a result of which the spreader 27 with the animal hanging from it will slide away, due to the force of gravity, to a following part of the conveyor, by means of which the animal can be moved further through the slaughterhouse for butchering.

FIG. 18 shows a perspective view of a device according to the invention.

The parts described with reference to the preceding figures, such as the leg holders 2, the leg pressers 5, the heel pushers, the toe pressers 16, the penetration devices and the spreader positioning device, are in the background, and partly not shown. They are all movable fixed to the frame 36. In the foreground two conveyor mechanisms are shown, in this case conveyor belts 40, 41, on which the slaughtered animal can be conveyed lying on its back. The direction of conveyance is indicated by arrows, and the animals are positioned on the conveyor belts with their hind legs in the direction of conveyance. In this position in which the legs are directed upwards, it is particularly simple to take the hind legs 1 into the leg holders 2 by means of the drive of the conveyor belt 41, as shown in FIG. 1a. A sensor, e.g. a light-sensitive cell at one side of the conveyor belt, coupled to a light source set up at the other side of the conveyor belt, the light beam of which is interrupted by a passing animal, ensures a suitable control of the drive, so that the leg holders 2 cannot be damaged by a collision with the animal.

During operation of the device the complication can arise that one of the two, or both, hind legs 1 are lying over the belly of the animal. In order to be sure that the animal arrives at the leg holders 2 with its hind legs 1 upright, provision is made for a leg guide 42, designed as a horizontal, wedge-shaped structure whose tip is movable in the vertical direction through turning of the structure about an axis 43. The tip of the essentially horizontally arranged leg guide 42 is always held down by the force of gravity or by the force of a spring. The tip of the leg guide is also bent upwards slightly.

The leg guide works as follows: When an animal is brought in along the conveyor belt 41, the leg guide 42 slides between the hind legs 1 over the belly of the animal, and the increasingly widening leg guide 42 raises up any legs 1 lying on the belly.

Placed upstream of the conveyor belt 41 is a second conveyor belt 40 which runs in the same direction at a lower speed. This means that if a continuous row of animals arrives on the conveyor belt 40, space is obtained between the animals at the transition from belt 40 to belt 41. This space can be used by providing a light source or a light-sensitive cell on either side of the end of the conveyor belt 40, by means of which such a space can be established, and this information can also be used for such control of the drive of the belt 40 that there is always only one animal at a time on the belt 41, while several ready animals are on belt 40.

If desired, a stop partition 60, which can be moved in a vertical direction to two rest positions, can be placed between the first and the second conveyor belts, which stop partition in one position impedes the conveyance of animals from conveyor belt 40 to conveyor belt 41, while in the other position it does not constitute such an obstruction. The movement of the stop partition 60, which is controlled by means of the above-mentioned light-sensitive cell, and is carried out by means of a double-acting cylinder/piston unit 61, provides mechanical certainty for the requirement that only one animal at a time may be on belt 41.

Figures 19A, 19B:
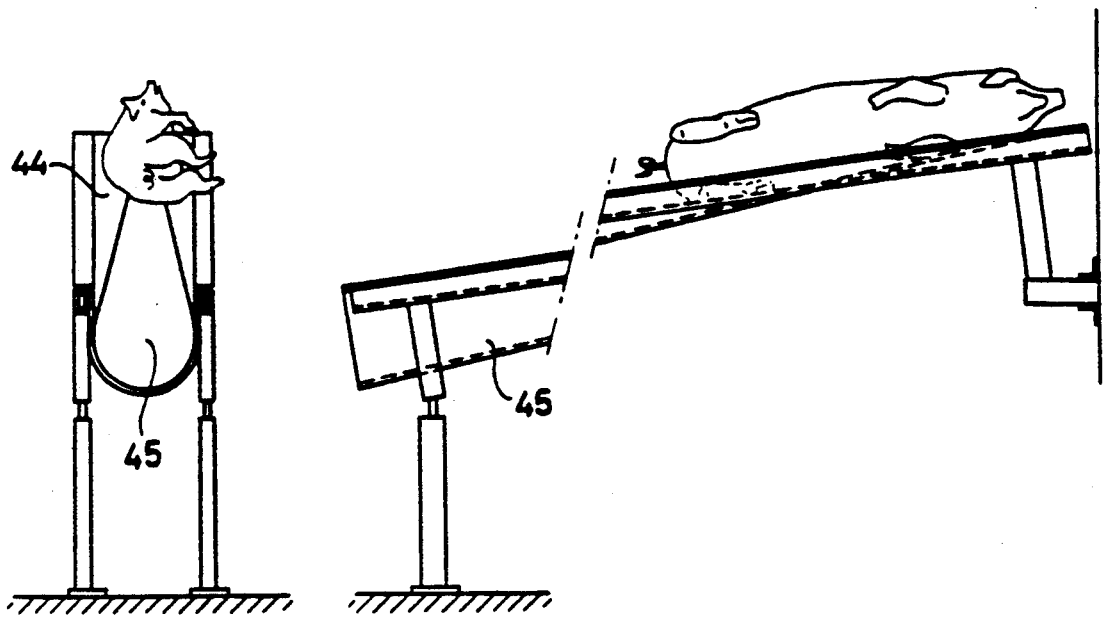
FIGS 19a-19d show a turning device for turning slaughtered lying on one side onto their backs.
Figures 19C, 19D:
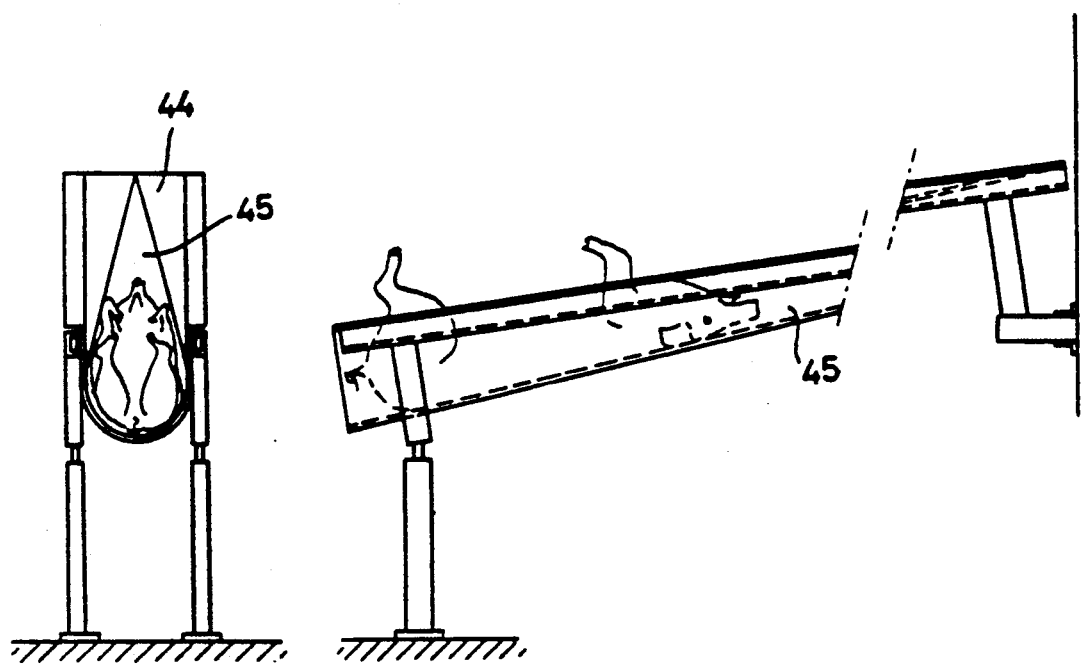

Prior to the treatment in the device according to the invention, the animals lie with their hind legs in the direction of conveyance, but on one side. For turning the animals from their sides onto their backs, provision is made for a turning device, which is shown in FIGS. 19a and 19b. The turning device is arranged upstream of the conveyor belt 40 and comprises two chutes 44, 45, of which the first chute 44 is placed at a small angle to the horizontal plane, for example 5° to 10°, and the second chute 45 widens out from the center and is placed at a small angle to the first chute 44. The width of the last chute 45 is essentially equal to the greatest width of the animal. The speed of conveyance of the conveyor belt 40 is selected to be approximately the same as the speed at which the animal leaves the chute 45.

Figure 20:
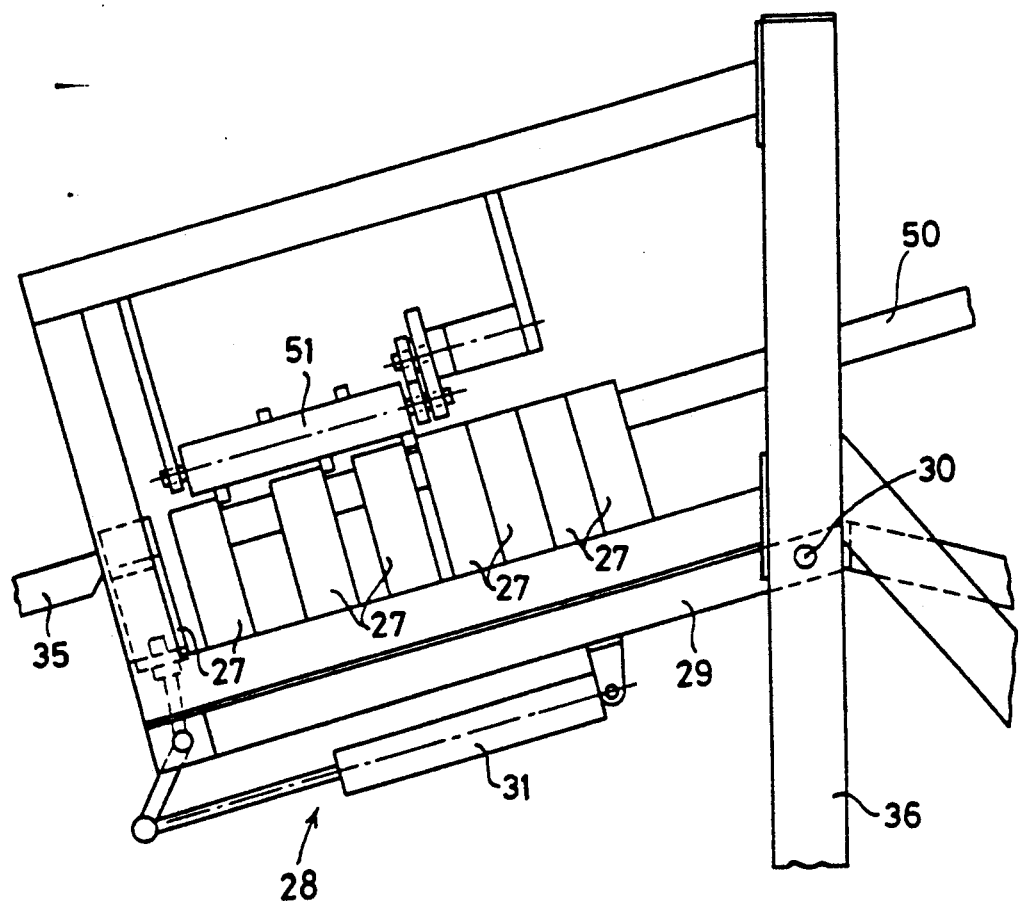
FIG. 20 shows a side view of a device for feeding in spreaders.

In order to keep the animals on their backs during the remaining conveyance along the conveyor belts 40, 41, guide plates 46 are placed on either side of the belts, as shown in FIG. 18, said guide plates being fitted so that they are movable at right angles to the direction of conveyance and are spring-loaded towards the center of the conveyor belt, and are placed at a distance from each other which essentially corresponds to the greatest width of the animal The infeed of spreaders 27 is explained with reference to FIG. 20. The spreaders 27 arrive at the spreader positioning device, sliding along a tubular infeed device 50, where they are buffered while awaiting use. From the buffer the spreaders are fed in to the spreader positioning device 28 one by one by means of, for example, a spreading roller 51. The arm 29 has gripping elements which can grip the spreader 27 which has been fed in, following which it can be positioned in the manner described in connection with FIGS. 11 and 12.

The parts of the device described are preferably made of stainless steel, since the surface thereof is exposed to relatively polluting and rough operating conditions, while the hygiene of the device has to be ensured.

It will be clear that the above description is based on a device in which a spreader is placed in the hind legs of the slaughtered animal lying on its back. It is then possible without further ado to design a device which can place the spreader if the animal is not only lying on its back, but is lying on, e.g., one side or on its belly, without departing from the principles described in the claims.

Of course, the device according to the invention can also be used for placing spreaders in the hind legs of dead slaughtered animals other than pigs, for example cattle or sheep, in which case the positioning, fixing and control means must be adapted to the specific physical features of the animals in question.

What is claimed is:

1. A device for the placing of a spreader in the hind legs of a dead slaughtered animal, in particular a pig, the spreader having a pair of ends, one end for each hind leg, comprising:
    two penetration devices, each comprising a penetration pin provided with a pointed end, a penetration tube which is movable in the axial direction and is open at one side, and in which the penetration pin is accommodated so that it can be moved in the axial direction, and a slide-off mechanism which is movable relative to the penetration tube;
    means for positioning of the legs relative to the penetration device and toe pressers for bending the toes relative to the legs virtually at a right angle;
    positioning, fixing and control means for moving and placing the slaughtered animal, the spreader, the leg positioning means, toe pressers and the penetration device, in such a way that each penetration tube together with the penetration pin projecting from the penetration tube can be inserted at a predetermined place fully through a hind leg between the bone and the tendons thereof when the hind legs are spread little if at all, following which the penetration pin is retracted into the penetration tube, the hind legs with the penetration tubes placed in them are spread, the opening of each penetration tube is placed over a corresponding end of the spreader, each hind leg is moved off the penetration tube onto the corresponding end of the spreader by means of the slide-off mechanism, and the penetration tubes are freed from the ends of the spreader.

2. A device according to claim 1, wherein the point of each penetration pin lies off-center relative to the axis of the penetration pin.

3. A device according to claim 2, wherein the penetration pin point is formed by four faces intersecting each other in a point, the line of intersection of the face which is intended for moving along the bone and the face intended for moving along the tendons being at a right angle to the axis of the penetration pin, and the angle between the first-mentioned face and the penetration pin axis being maximum equal to the angle between the last-mentioned face and said axis.

4. A device according to claim 2 or 3, wherein the end of each penetration tube lying at the penetration pin point side is provided with a bevelled edge.

5. A device according to claim 1, wherein the ends of the spreader lie in line with the penetration tube during the sliding of the hind legs off the penetration tube.

6. A device according to claim 5, wherein the slide-off mechanism is formed by a leg holder.

7. A device according to claim 1, comprising a spreader positioning device, by means of which at the supply side thereof a spreader is removed downwards from a buffer stock present at an interruption in a conveyor which is located above the positioning device, and along which the spreaders are fed in and discharged, said spreader is turned about its longitudinal axis through a total of virtually 180°, is placed in the hind legs, is turned back, and is placed with the conveyance hook on the conveyor at the discharge side.

8. A device according to claim 7, wherein the turning movement of the spreader takes place in two stages.

9. A device according to claim 1, wherein the animals are fed in thereto, lying on their backs, with their hind legs in the direction of conveyance.

10. A device according to claim 1, wherein the animals are fed in, lying on one side, with their hind legs in the direction of conveyance, and are turned onto their backs in a turning device, comprising a first chute which is directed downwards at a small angle to the horizontal, and which in the direction of conveyance passes into a second chute which widens out from the center and is disposed at a small angle to the first chute, and the greatest width of which corresponds essentially to the greatest width of the animal.

11. A device according to claim 1, comprising a conveyor mechanism, set up downstream of the turning device, and comprising two horizontal conveyor belts, which are placed one after the other and move in the same direction, the second belt moving faster than the first belt, and the belts being controlled in such a way by sensors that no more than one animal at a time can be on the second belt and is conveyed thereon to the position for placing of the spreader.

12. A device according to claim 11, wherein a partition, which can be moved in the vertical direction under the influence of sensors, is provided between the first belt and the second belt.

13. A device according to claim 1, wherein provision is made for a V-shaped leg guide which slides over the belly of the animal.

* * * * *

UNITED STATES PATENT AND TRADEMARK OFFICE
CERTIFICATE OF CORRECTION

PATENT NO. : 5,037,352

DATED : August 6, 1991

INVENTOR(S) : Van Der Hoorn et al.

It is certified that error appears in the above—identified patent and that said Letters Patent is hereby corrected as shown below:

Column 7, line 42, replace "19a and 19b" with --19a through 19d--.

Signed and Sealed this

Thirtieth Day of March, 1993

Attest:

STEPHEN G. KUNIN

*Attesting Officer*     Acting Commissioner of Patents and Trademarks